United States Patent [19]
Hoffman et al.

[11] Patent Number: 4,721,029
[45] Date of Patent: Jan. 26, 1988

[54] PRESSURIZED FLUID SUPPLY MEANS FOR RESCUE TOOLS

[75] Inventors: Kenneth F. Hoffman, Schwenksville; Robert J. Linster, Southampton, both of Pa.

[73] Assignee: Hale Fire Pump Company, Conshohocken, Pa.

[21] Appl. No.: 869,994

[22] Filed: Jun. 3, 1986

[51] Int. Cl.$^4$ .............................................. F15B 11/16
[52] U.S. Cl. ........................................ 91/520; 137/269
[58] Field of Search .................. 91/520, 508; 137/270, 137/269

[56] References Cited

U.S. PATENT DOCUMENTS 3,688,648  9/1972  D'Amato .................. 91/520 X

Primary Examiner—Alan Cohan
Attorney, Agent, or Firm—Frank A. Follmer

[57] ABSTRACT

A pressurized hydraulic fluid supply is arranged to supply hydraulic fluid to a plurality of rescue tools from a single power source through a series flow connector block so as to permit operation of two or more tools simultaneously.

24 Claims, 10 Drawing Figures

PRESSURIZED FLUID SUPPLY MEANS FOR RESCUE TOOLS

BACKGROUND AND SUMMARY OF THE INVENTION

This invention relates to a pressurized fluid supply means for hydraulically powered portable rescue tools. The fluid supply means of the invention is constructed and arranged to supply hydraulic fluid to a plurality of rescue tools from a single power source in an arrangement which is safe and which can be hooked up with speed and accuracy.

Portable rescue tools of the indicated type are used under emergency conditions, such as at the scene of an automobile accident, where the rescue personnel must operate with care and often very quickly to reach trapped victims and extricate them for medical treatment. Often two or more rescue tools must be used, such as a spreader, a cutter, and a ram. The rescue tools are usually powered by a hydraulic pump which is located on the rescue vehicle and supplies pressurized hydraulic fluid to the rescue tools by way of a hydraulic supply line, with a hydraulic return line being provided for recycling the lower pressure hydraulic fluid back to the pump supply reservoir. Typically, the rescue tool is operated by means of a switch mounted on the tool and constructed and arranged to introduce pressurized hydraulic fluid to opposite sides of a piston. The rescue tool often must be used at a location remote from the pump whereby the hydraulic supply and return lines are run a substantial distance.

While a single rescue tool operation is generally trouble free, there are problems with the present-day hook-ups for multiple rescue tool operation. In accordance with one present-day arrangement, the dual line from the pump to the first rescue tool is split off to add a dual line in series to the second rescue tool. This would normally require a 16 foot dual hose from the pump to the split point and a 16 foot dual hose from the split point to each of the two rescue tools. The addition of a third tool requires running a jumper line between the return line on the second tool and the intake on the third tool, and a line from the exhaust on the third tool back to the exhaust connection coming out of this second tool. The result is a large number of lines which run in all directions and which can be confusing to the fire department and rescue squads hooking them up, particularly at night.

Another present-day arrangement for use with two rescue tools includes the provision of a power unit with a direction control means such that a lever can be moved between two positions to deliver the pressurized fluid to either of the two dual lines that are connected separately to the two rescue tools. With this arrangement, it is possible to operate one or the other of the two rescue tools. However, this arrangement requires three operators, one at each of the two rescue tools and one operator at the power unit to move the direction control as desired. This can be dangerous, particularly at night, because under the pressure of an emergency situation it is possible to make a mistake and operate the wrong rescue tool at the wrong time which could cause an injury.

It is the general object of the present invention to provide a pressurized fluid supply means of the indicated type which overcomes the above-described problems of the prior art and which permits operation of a plurality of rescue tools simultaneously from a single power source in a safer and simpler manner.

Another object of the invention is to provide a pressurized fluid supply means of the indicated type which eliminates any problems of hose confusion.

Another object of the invention is to provide a fluid supply means of the indicated type which enables immediate and simple changeover from two to three rescue tools or from three to two rescue tools by means of the provision of a jumper hose means.

Briefly stated, the above and other objects of the invention are achieved by the provision of a series flow connector block provided with a plurality of internal flow passages each of which extends between a pair of ports on the surface of the block. Each of the ports are provided with flow connector fittings. The supply line of the power unit is connected to one of the fittings of one of the flow passages, the return line of the power unit is connected to one of the fittings of another flow passage and two or more power tools can be connected to the fittings on different passages in an arrangement to provide for series flow from the supply line of the power unit to each of the rescue tools in series and back to the power unit through the return line.

The above-described arrangement permits speed and accuracy in the hook-up of a plurality of rescue tools and eliminates any confusion as to which line should be connected to which rescue tool. The operator can simply make the connections to the rescue tools at the block whereat the fittings are readily accessible and easy to hook up. The operator simply connects the dual lines from the rescue tool to two appropriately marked fittings on the block and does this for each successive tool to be connected.

Furthermore, the above-described fluid supply means gives control of each of the rescue tools to the operator of that tool and eliminates the need for a third operator to control a direction control lever at the power unit. With the arrangement of the invention there can be simultaneous operation of any of the rescue tools and each operator can initiate operation of his rescue tool when he desires and does not have to consult with a third party. This eliminates the possibility of confusion in the communication between the various operators at the rescue site.

DETAILED DESCRIPTION OF THE PREFERRED EMBODIMENTS

Figure 1:
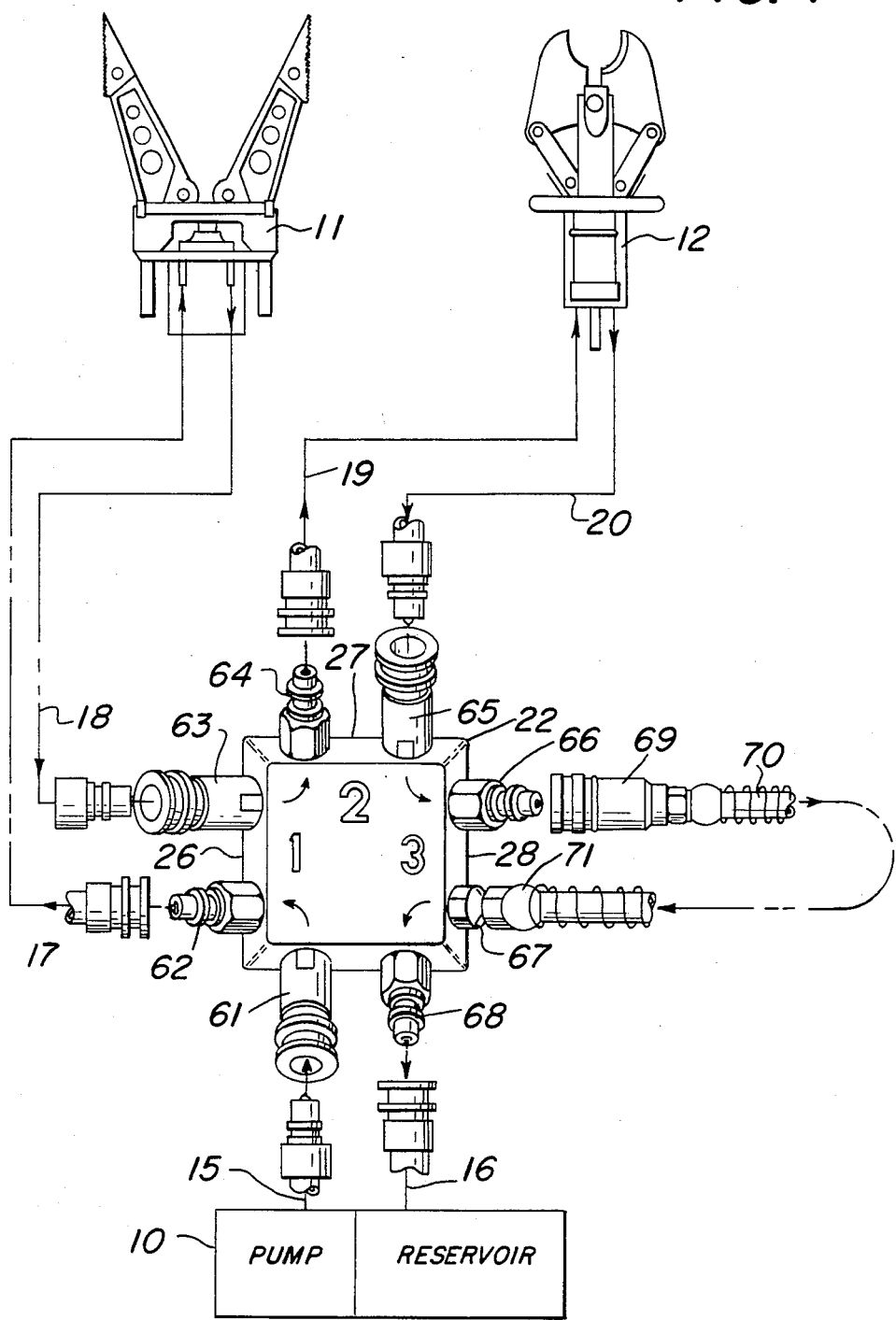
FIG. 1 is a view, partly diagrammatic, showing the hook-up of a pressurized fluid supply of the invention showing operation with two rescue tools.

In FIG. 1 there is shown a pressurized fluid supply in accordance with the invention wherein a single hydraulic fluid power source, namely, a pump 10, is hooked up to supply hydraulic fluid under pressure to two rescue tools 11 and 12, typically a spreader and a cutter, respectively. Pump 10 delivers the fluid under pressure through a supply line 15, with the low pressure, exhausted hydraulic fluid being returned from the rescue tools to the fluid supply reservoir for pump 10 by way of a return line 16. Rescue tool 11 has a supply line 17 connected thereto for delivering pressurized fluid to its intake side and a return line 18 connected thereto for returning fluid from the exhaust side thereof. Rescue tool 12 has a supply line 19 connected thereto for delivering pressurized fluid to its intake side and a return line 20 connected thereto for returning the fluid from the exhaust side thereof. Lines 15-20 are all flexible hydraulic hoses capable of withstanding the high pressure of the system and are provided at their remote end with quick release couplings as will be described hereafter. As is conventional, pump 10 is preferably a lightweight compact pump that can be conveniently carried by a rescue vehicle. Preferably, pump 10 should provide sufficient hydraulic pressure for a cutting force of approximately 12 to 15 tons and allow for the opening and closing of a cutter-type rescue tool within about five seconds.

Figure 4:
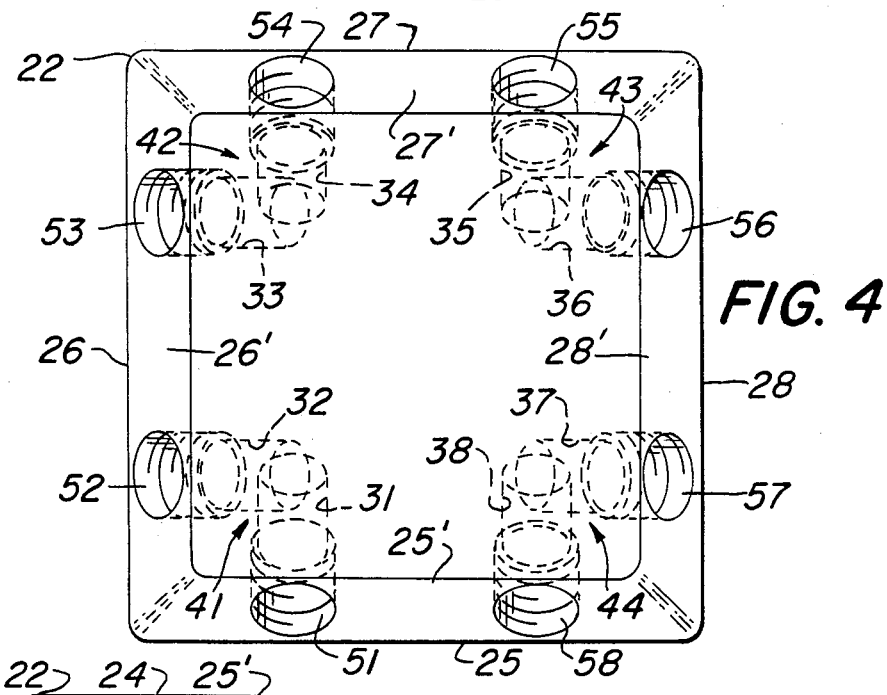
FIG. 4 is a plan view of the series connector block in accordance with the invention.
Figure 5:
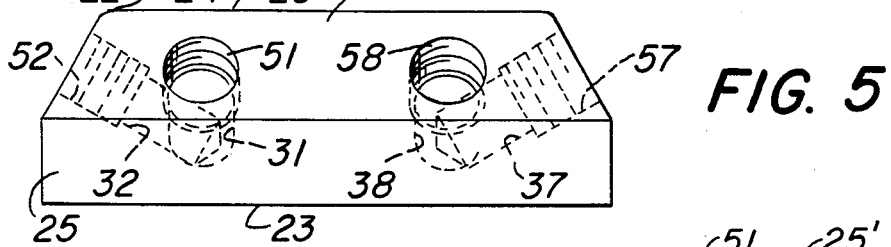
FIG. 5 is an end view of the block shown in FIG. 4.
Figure 6:
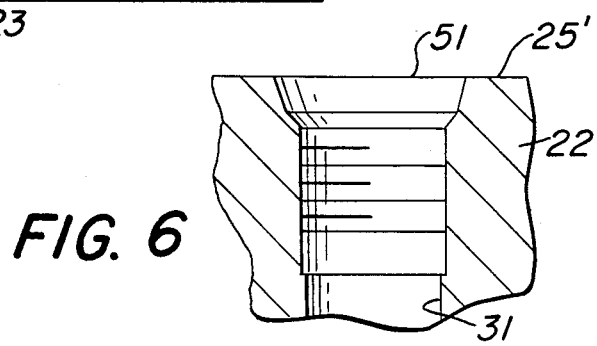
FIGS. 6 is a detail view showing the port construction in the block shown in FIG. 4.

The pressurized fluid supply means of the invention comprises a series flow connector block 22 shown in detail in FIGS. 4-6. Block 22 is made of a solid block of alloy steel and has a generally rectangular configuration. Block 22 has a flat bottom 23, a flat top 24 and four side walls 25-28 joined at right angles at four corners. Each of the side walls 25-28 has a flat bevelled upper side wall portion 25'-28', respectively, facing upwardly at an angle to the vertical. Block 22 is provided with eight bores 31-38 extending inwardly at right angles from the surfaces of side wall portions 25'-28' in an arrangement to form four internal flow passages 41, 42, 43 and 44. To this end, bores 31 and 32 intersect at their inner ends to form flow passage 41, bores 33 and 34 intersect at their inner ends to form flow passage 42, bores 35 and 36 intersect at their inner ends to form flow passage 43, and bores 37 and 38 intersect at their inner ends to form flow passage 44. As is apparent from FIG. 2, each side wall portion 25'-28' is provided with two of the bores 31-38 and each of the flow passages 41-44 is formed by two of the bores 31-38 in an arrangement such that each flow passage 41-44 extends around a corner of block 22.

The outer ends of each of bores 31-38 whereat they join with wall portions 25'-28' have a standard SAE port formed therein. FIG. 6 is a detail showing of the tapered outer end and threaded portions of each of the standard SAE ports that are formed. FIG. 4 shows the ports 51-58 which are formed at the outer ends of bores 31-38, respectively. As shown in FIG. 1, each of the ports 51-58 has a flow connection fitting 61-68, respectively, associated therewith and constructed and arranged to deliver fluid from the associated bore and passageway to a flow line connected thereto as described hereafter. Each of the fittings 61-68 is provided with one half of a quick release coupling for its connection to another half of a quick release coupling formed on the ends of the flow lines as described hereafter.

Thus, fitting 61 is threadedly mounted in port 51 and is provided with a female coupling end for connection to the male coupling end of the pressurized fluid supply line 15 from pump 10. Fitting 62 is threadedly mounted in port 52 and is provided with a male coupling end connected to the female coupling end of supply line 17 for the first rescue tool 11. Fitting 63 is threadedly mounted in port 53 and is provided with a female coupling end connected to the male coupling end of return line 18 for the first rescue tool 11. Fitting 64 is threadedly mounted in port 54 and is provided with a male coupling end connected to the female coupling end of supply line 19 for the second rescue tool 12. Fitting 65 is threadedly mounted in port 55 and is provided with a female coupling end connected to the male coupling end of the return line 20 for the second rescue tool 12. Fitting 66 is threadedly mounted in port 56 and is provided with a male coupling end connected to the female coupling 69 at one end of a jumper hose connection 70. Fitting 67 is threadedly mounted in bore 57 and is constructed and arranged to be connected to a fitting 71 at the other end of the jumper hose 70. Fitting 68 is threadedly mounted in port 58 and is provided with a male coupling end connected to the female coupling end of the return line 16 connected to the fluid supply reservoir of pump 10.

In FIG. 1 the fluid supply means of the invention is shown hooked up for two tool operation. The flow through the system is shown by the arrows in FIG. 1. Thus, the pressurized fluid is delivered from pump 10 through line 15 to fitting 61 and flows through the passage 41 to be delivered through fitting 62 to the supply line 17 for the first rescue tool 11. The fluid is exhausted from rescue tool 11 and passes through return line 18 to fitting 63 and through passage 42 to fitting 64. The fluid passes from fitting 64 to the supply line 19 for delivering pressurized fluid to the intake of the second rescue tool 12. From the exhaust of rescue tool 12 the fluid is delivered through line 20 to fitting 65 from which it passes through passage 43 to fitting 66. The fluid is delivered from fitting 66 to jumper hose 70 and passes therethrough to fitting 67 whereupon the fluid passes through passage 44 to fitting 68. From fitting 68 the fluid passes through return line 16 back to the fluid supply reservoir of pump 10 to complete the circuit of fluid flow. It will be apparent that the fluid supply means shown in FIG. 1 causes the fluid to be delivered in series to the rescue tools 11 and 12 from a single fluid power source, ie., pump 10.

Figure 2:
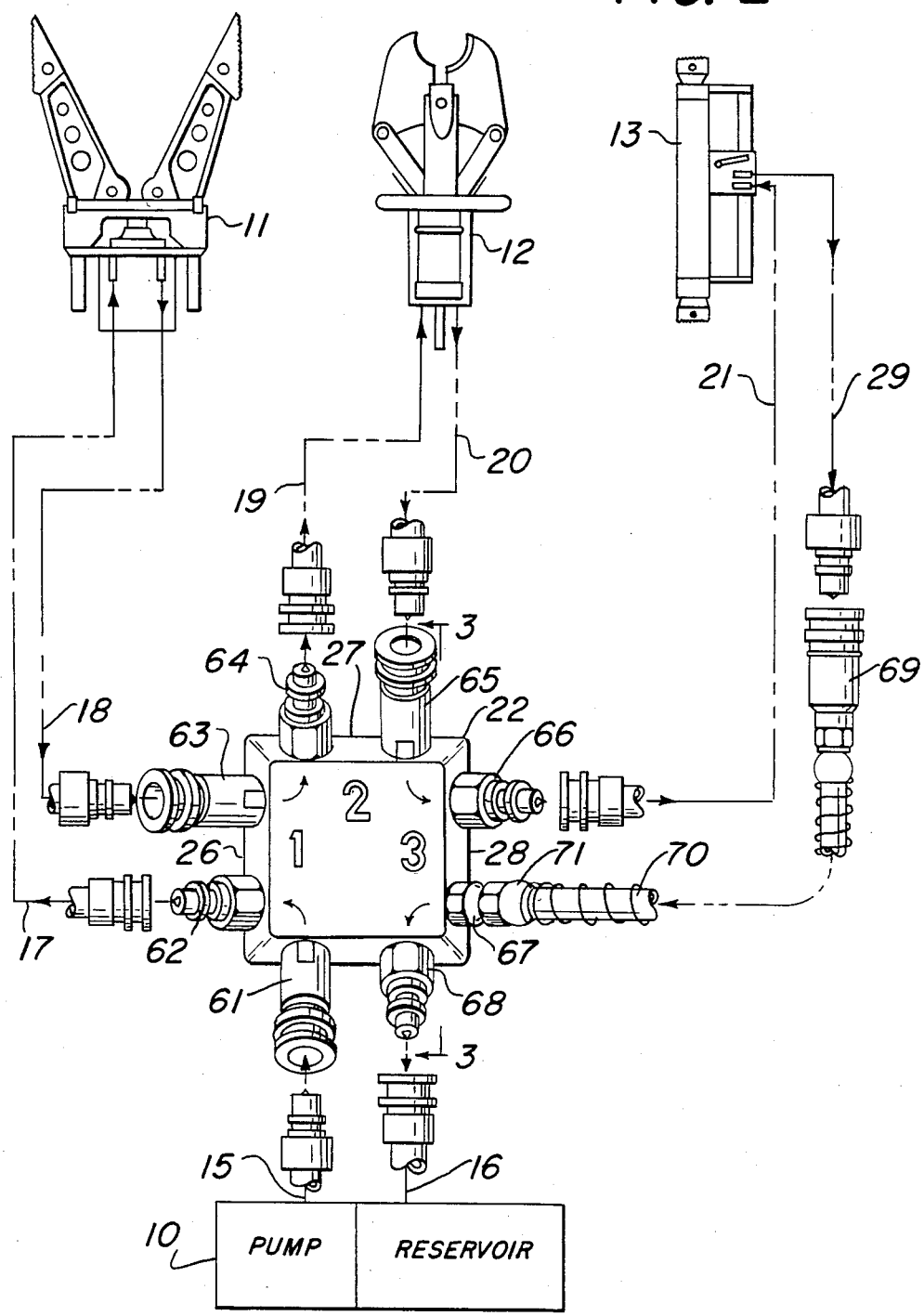
FIG. 2 is a view similar to FIG. 1 showing the hook-up for the operation of three rescue tools.
Figure 3:
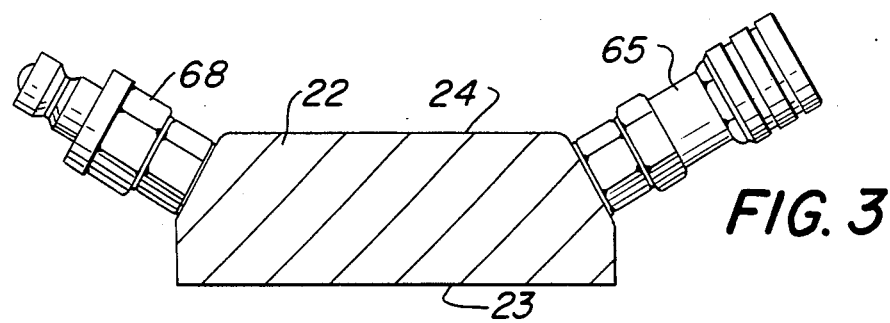
FIG. 3 is a sectional view taken on line 3—3 of FIG. 2.

In FIG. 2 there is shown the arrangement in accordance with the invention whereby the fluid supply means is hooked up for three tool operation. This arrangement is identical to that described in respect of FIG. 1 in that the lines 15, 16, 17, 18, 19 and 20 are all connected to the fittings 61-65 and 68 as described above. The only difference is that, in the FIG. 2 arrangement, fitting 66 is connected to the supply line 21 for delivering the fluid to the intake of a third rescue tool 13, such as a ram, and jumper hose 70 is connected to the return line 29 from the third rescue tool 13. By reason of this hookup, the three rescue tools 11, 12 and 13 are each supplied with pressurized fluid in series, the fluid flowing sequentially through lines 15, 17, 18, 19, 20, 21 and 29 and sequentially through the internal passages 41, 42, 43 and 44 so that the three tools 11, 12 and 13 are supplied in series.

The block 22 is designed with several features which make it possible for the operator to hook up the hoses from the pump 10 and tools 11, 12 and 13 with ease and quickness. To this end, the bevelled surfaces 25'-28' provide an arrangement whereby the fittings 61-68 extend upwardly at an angle to the ground whereby it is easier for the operator to connect the quick release couplings together by reason of the orientation of the fittings 61-68. In addition, in order to aid the operator in hooking up the hoses from pump 10 and tools, 11-13 correctly, the sides 26, 27 and 28 of block 22 are marked with the numbers "1", "2", and "3", respectively. This marking reminds the operator that the first tool 11 is to be hooked up to fittings 62 and 63 on the side 26 marked number "1", that the second tool 12 is to be hooked up to fittings 64 and 65 on the side 27 marked number "2", and that the third tool 13 is to be hooked up to fittings 66 and 69 on the side 28 marked number "3".

The recommended procedure for hooking up the block 22 is as follows:

The hoses 17 and 18 for the first rescue tool 11 are connected to the fittings 62 and 63 on the side 26 marked number "1". Likewise, hoses 19 and 20 for the second rescue tool 12 are connected to the fittings 64 and 65 on the side 27 marked number "2". In the case of a two tool operation, the jumper hose 70 is connected between fittings 66 and 67. In the case of a three tool operation, the supply line 21 for third rescue tool 13 is connected to the male fitting 66 and the return line 29 is connected to the female coupling 69 on the end of jumper hose 70. After attaching the rescue tools 11, 12 and 13, it is important to be certain that the bypass valve for the pump 10 is in the "dump" or "return" position. After checking this, hoses 15 and 16 for the pump 10 are connected to the fittings 61 and 68 as shown in FIG. 1. After this connection, the bypass valve of the pump 10 is moved to the "pressure" or "run" position and the fluid supply is ready for use.

The recommended procedure for converting from a two tool operation to a three tool operation is as follows:

If block 22 is not already in use, the jumper hose 70 is disconnected from fitting 66 and is ready to be put in service. However, if block 22 is already hooked up to the tools 11 and 12 and pump 10, it is important to move the bypass valve on the pump 10 to the "return" or "dump" position. Then the jumper hose 70 is disconnected from fitting 66 and fittings 66 and 69 can be attached to the supply and return lines 21 and 29 from the third tool 13 as described above. After these connections for the tools 11, 12 and 13 have been made, the bypass valve on pump 10 is returned to the "pressure" or "run" position.

In FIGS. 7-10 there is shown another type of series flow connector block 22a in accordance with the invention. Since this block 22a is similar to the block 22 described above, corresponding parts have been given the same reference numerals with an "a" added. Block 22a has added thereto a valve means for recirculating flow from the hydraulic power source so that the pressure on the rescue tools can be controlled at the location of the block 22a, and it is not necessary for the operator to get all the way back to the power source to relieve the pressure on the rescue tools and to turn the pressure back on again when needed. Once the fluid supply system has been hooked up to supply pressure through a block to the tools, it is necessary to relieve this pressure before any tools can be switched or the number of tools can be changed.

Referring to FIGS. 7-10, block 22a is a solid block and has a generally rectangular configuration with a flat bottom 23a and a flat top 24a and four vertical side walls 25a-28a joined at right angles at four corners. Block 22a is provided with eight bores 31a-38a. Bores 33 and 34 intersect at their inner ends to form a passage 42a and bores 35a and 36a intersect at their inner ends to form a passage 43a, each passage extending around the corner of the block 22a. For a purpose to be explained hereafter, it is noted that bores 31a and 32a do not intersect at their inner ends as is also the case with bores 37a and 38a.

The outer ends of each of the bores 31a-38a has a standard SAE port formed thereon as is the case with block 22, the ports 51a-58a being formed at the outer ends of bores 31a-38a, respectively. As described above with respect to block 22, each of the ports 51a-58a is adapted to have a flow connection fitting 61-68, respectively, connected thereto.

As was stated above, passageways 31a and 32a do not intersect at their inner ends. Instead, the inner ends of bores 31a and 32a are connected to vertically extending bores 31a' and 32a', respectively, which provide flow communication with the top surface 24a of block 22a. Also the inner ends of bores 37a and 38a do not intersect but they are connected to vertically extending bores 37a' and 38a' which provide flow communication with the top surface 24a of block 22a.

The valve means comprises a circular block 80 mounted for rotation about a vertically extending pin 81 extending upwardly from block 22a. Block 80 is slidably supported at its bottom 82 on the top surface 24a of block 22a. Block 80 is provided with three internal flow passages 84, 86 and 88. As is shown in the Drawings, passage 84 has a horizontal passage portion extending between two vertical passage portions which terminate at ports in the bottom 82 of block 80 whereat block 80 mates with the top surface 24a of block 22a. Passage 86 also is comprised of a horizontal passage portion extending between two vertical passage portions which terminate at ports in the bottom 82 of block 80. Passage 88 also is comprised of a horizontal passage portion extending between two vertical passage portions which terminate at ports in the bottom 82 of block 80. The mating surfaces at top 24a and bottom 82 are provided with sealing means (not shown) for the bores therein.

Figure 7:
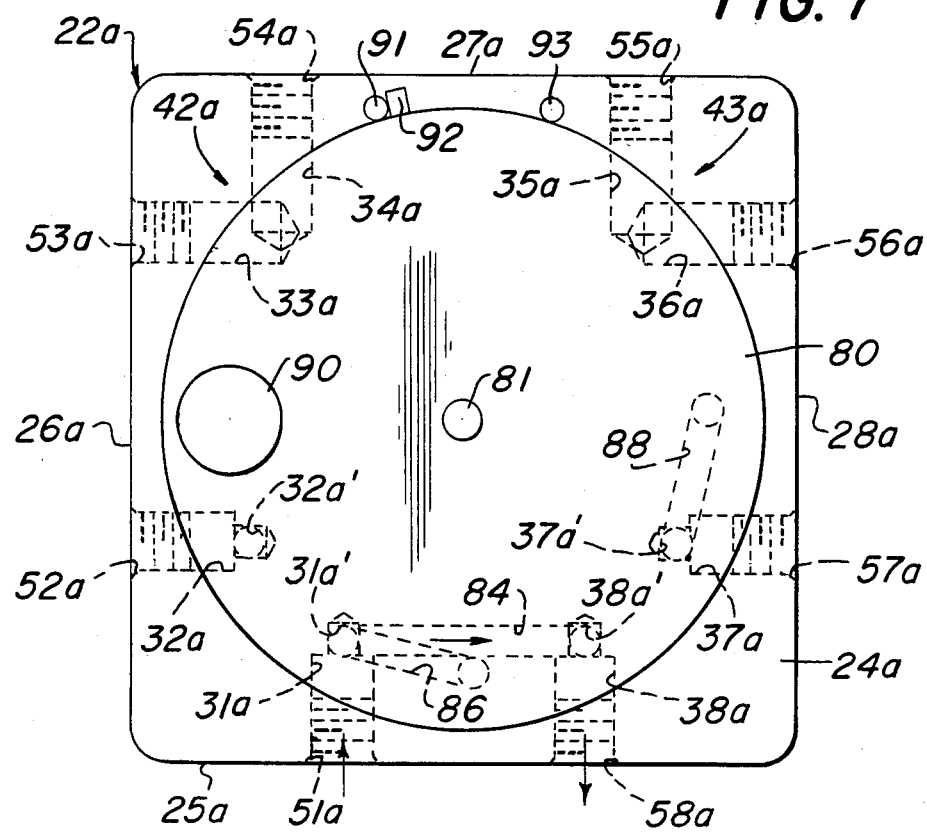
FIG. 7 is a plan view of a series connector block in accordance with a second embodiment of the invention.
Figure 8:
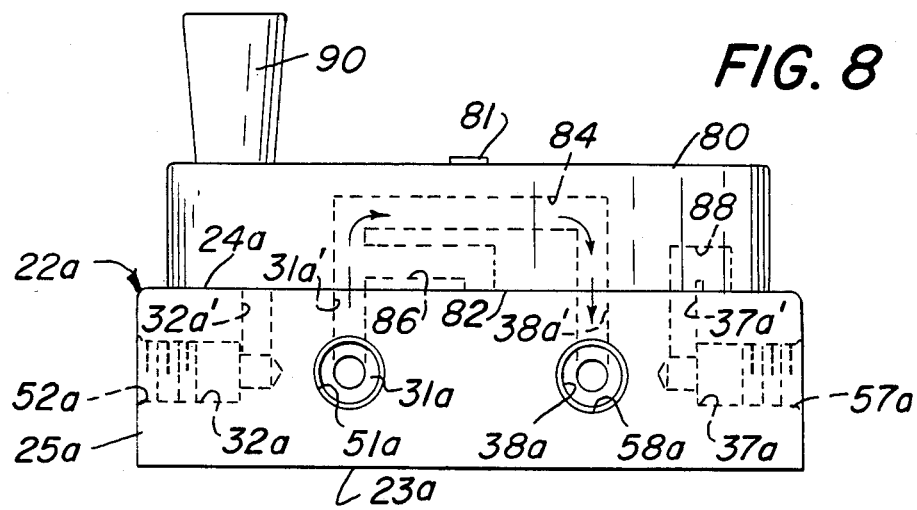
FIG. 8 is an end view of the block shown in FIG. 7.
Figure 9:
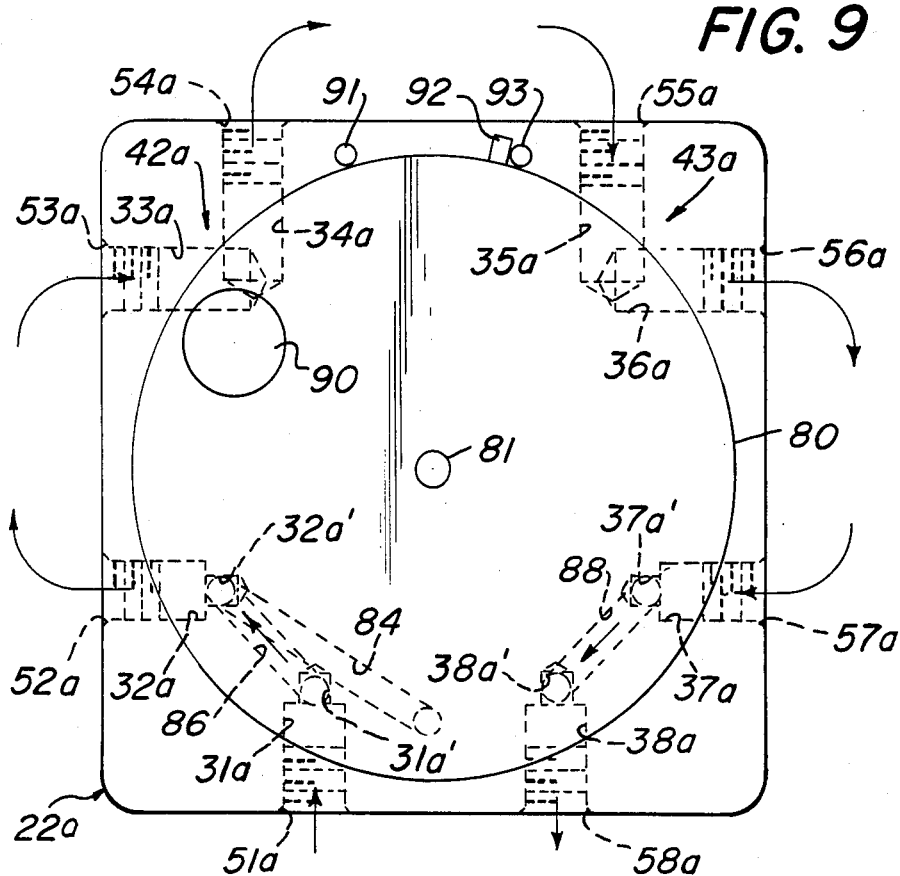
FIG. 9 is a plan view of the block shown in FIG. 7 with the parts in an alternate position.
Figure 10:
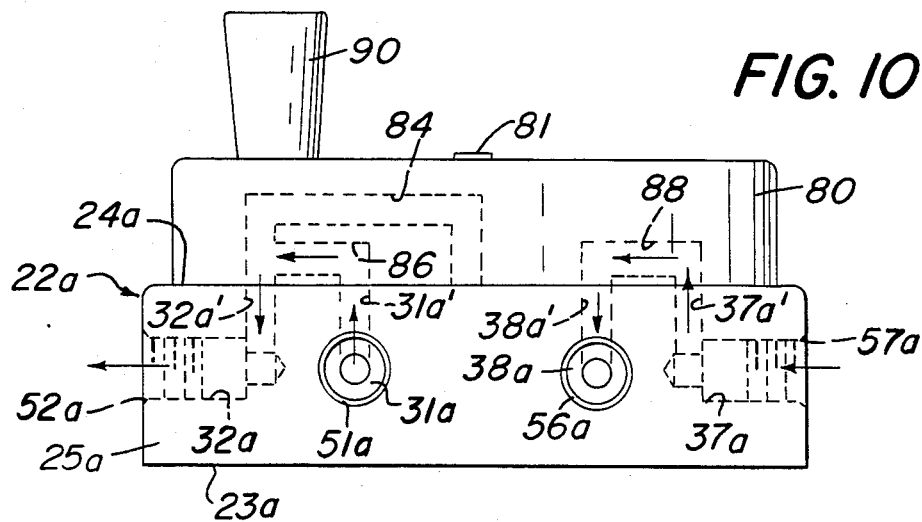
FIG. 10 is an end view of the block shown in FIG. 9.

The valve means is constructed and arranged for movement between a pair of flow control positions, namely, the "RETURN" position shown in FIGS. 7 and 8 and the "RUN" position shown in FIGS. 9 and 10. Block 80 is provided with a handle 90 for use in rotating block 90 between the two flow controlling positions thereof. Also, stops 91-93 are provided on blocks 22a and 80 to limit block 80 in the RETURN and RUN positions.

In the RETURN position of the valve means, block 80 is positioned so that passageway 84 is in flow communication at its terminal ports with the vertical bores 31a' and 38a' on block 22a. In this position, the fluid flows from the pressure side of the hydraulic power source sequentially through bore 31a, vertical bore 31a' and valve passage 84 to vertical bore 38a' and bore 38a for return to the reservoir of the power source. In this position, the pressurized fluid flow is interrupted to the rescue tools since there is no connection with bores 32a or 37a.

In the RUN position of the valve means, block 80 is rotated to the position shown in FIGS. 9 and 10. In this position of block 80, valve flow passage 86 is in flow communication with the vertical bores 31a' and 32a' to provide flow communication between bores 31a and 32a as is apparent from a consideration of FIGS. 9 and 10. Also, valve flow passage 88 is in flow communication with the vertical bores 37a' and 38a' to provide flow communication between bores 37a and 38a. The flow of pressurized fluid through the block 22a and block 80 is shown by the arrows in FIGS. 9 and 10 from which it is apparent that in the RUN position of the valve means, the pressurized fluid can be delivered in series to the rescue tools as described above with respect to FIGS. 1 and 2.

What is claimed is:

1. In a pressurized fluid supply for a plurality of hydraulically powered rescure tools wherein a single power unit, as a pump, has a supply line for delivering the fluid under pressure and a return line through which the fluid is returned to the power unit, and wherein each of the rescue tools has a suply line for delivering presurized fluid to an intake thereof and a return line for returning fluid from an exhaust thereof, a series flow connector block means having a plurality of internal flow passages, each of said internal flow passages providing flow communication between a pair of ports formed in an external surface of said block means, a flow connector fitting associated with each of said ports and mounted on the external surface of said block means to extend from an associated port externally of said block means, each of said fittings being constructed and arranged to deliver the fluid from its associated port and the flow passage communicating therewith to a flow line connected to the fitting to extend externally of said block means, said external flow lines including a power unit supply line being connected to to a first fitting associated with one port of a first passage, a supply line of a first rescue tool being connected to a second fitting associated with the other port of said first passage, a return line of the first rescue tool being connected to a third fitting associated with one port of a second passage, a supply line of a second rescue tool being connected to a fourth fitting associated with the other port of said second passage, flow line means for connecting the return line of the second rescue tool to a fifth fitting associated with one port of a third passage, and a power unit return line being connected to a sixth fitting associated with the other port of said third passage, whereby the fluid flows from said power unit serially through the supply and return lines of said first and second rescue tools and back to said power unit by way of said first, second and third passages in said block means.

2. A fluid supply according to claim 1 wherein each of said pasages is formed by a pair of straight boxes extending into said block from the surface thereof and interconnecting at inner ends of the pair of bores.

3. In a pressurized fluid supply for a plurality of hydraulically powered rescue tools wherein a single power unit, such as a pump, has a supply line for delivering the fluid under pressure and a return line through which the fluid is returned to the power unit, and wherein each of the rescue tools has a supply line for delivering pressurized fluid to an intake thereof and a return line for returning fluid from an exhaust thereof, a series flow connector block means having a plurality of internal flow passages, each of said internal flow passages providing flow communication between a pair of ports formed in a surface of said block means, a flow connector fitting associated with each of said ports and mounted on said block means, each of said fittings being constructed and arranged to deliver the fluid from its associated port and the flow passage communicating therewith to a flow line connected to the fitting, the power unit supply line being connected to a first fitting associated with one port of a first passage, the supply line of a first rescue tool being connected to a second fitting associated with the other port of said first passage, the return line of the first rescue tool being connected to a third fitting associated with one port of a second passage, the supply line of a second rescue tool being connected to a fourth fitting associated with the other port of said second passage, means for connecting the return line of the second rescue tool to a fifth fitting associated with one port of a third passage, the power unit return line being connected to a sixth fitting associated with the other port of said third passage, whereby the fluid flows from said power unit serially through the supply and return liens of said first and second rescue tools and back to said power unit by way of said first, second and third passages in said block means, said block means having a plurality of side walls joined at corners, each of said passages extending from a port on one side wall around a corner to a port on an adjacent side wall.

4. A fluid supply according to claim 3 wherein each side wall has only two ports therein.

5. A fluid supply according to claim 3 wherein one fitting on one of the ports on a side wall is a male fitting and the other fitting on the other port on said side wall is a female fitting whereby a rescue tool can be connected with its supply and return lines connected to the male and female fittings on one side wall.

6. In a pressurized fluid supply for a plurality of hydraulically powered rescue tools wherein a single power unit, such as a pump, has a supply line for delivering the fluid under pressure and a return line through which the fluid is returned to the power unit, and wherein each of the rescue tools has a supply line for delivering pressurized fluid to an intake thereof and a return line for returning fluid from an exhaust thereof, a series flow connector block means having a plurality of internal flow passages, each of said internal flow passages providing flow communication between a pair of ports formed in a surface of said block means, a flow connector fitting associated with each of said ports and mounted on said block means, each of said fittings being constructed and arranged to deliver the fluid from its associated port and the flow passage communicating therewith to a flow line connected to the fitting, the power unit supply line being connected to a first fitting associated with one port of a first passage, the supply line of a first rescue tool being connected to a second fitting associated with the other port of said first passage, the return line of the first rescue tool being connected to a third fitting associated with one port of a second passage, the supply line of a second rescue tool being connected to a fourth fitting associated with the other port of said second passage, means for connecting the return line of the second rescue tool to a fifth fitting associated with one port of a third passage, the power unit return line being connected to a sixth fitting associated with the other port of said third, passage, whereby the fluid flows from said power unit serially through the supply and return lines of said first and second rescue tools and back to sasid power unit by way of saisd first, second and third passages in said block means, said block means having a bottom wall adapted to be supported in a horizontal orientation and a plurality of side walls having a flat surface facing upwardly at an angle to the vertical, the ports of each passage communicating with said upwardly facing flat surface of a side wall.

7. In a pressurized fluid supply for a plurality of hydraulically powered rescue tools wherein a single power unit, such as a pump, has a supply line for delivering the fluid under pressure and a return line through which the fluid is returned to the power unit, and wherein each of the rescue tools has a supply line for delivering pressurized fluid to an intake thereof and a return line for returning fluid from an exhaust thereof, a series flow connector block means having a plurality of internal flow passages, each of said internal flow passages providing flow communication between a pair of ports formed in a surface of said block means, a flow connector fitting associated with each of said ports and mounted on said block means, each of said fittings being constructed and arranged to deliver the fluid from its associated port and the flow passage communicatng therewith to a flow line connected to the fitting, the power unit supply line being connected to a first fitting associated with one port of a first passage, the supply line of a first rescue tool being connected to a second fitting associated with the other port of said first passage, the return line of the first rescue tool being connected to a third fitting associated with one port of a second passage, the supply line of a second rescue tool being connected to a fourth fitting associated with the other port of said second passage, means for connecting the return line of the second rescue tool to a fifth fitting associated with one port of a third passage, the power unit return line being connected to a sixth fitting associated with the other port of said third passage, whereby the fluid flows from said power unit serially through the supply and return lines of said first and second rescue tools and back to said power unit by way of said first, second and third passages in said block means, the return line from said second tool being connected to a seventh fitting associated with one port of a fourth passag, said means for connecting the return line of the second tool to the one port of said third passage including a jumper flow line extending between the other port of said fourth passage and the one port of said third passage.

8. In a pressurized fluid supply for a plurality of hydraulically powere rescue tools wherein a single power unit, such as a pump, has a supply line for delivering the fluid under pressure and a return line through which the fluid is returned to the power unit, and wherein each of the rescue tools has a supply line for delivering pressurized fluid to an intake thereof and a return line for returning fluid from an exhaust thereof, a series flow connector block means having a plurality of internal flow passages, each of said internal flow passages providing flow communication between a pair of ports formed in a surface of said block means, a flow connector fitting associated with each of said ports and mounted on said block means, each of said fittings being constructed and arranged to deliver the fluid from its associated port and the flow passage communicating therewith to a flow line connected to the fitting, the power unit supply line being connected to a first fitting associated with one port of a first passage, the supply line of a first rescue tool being connected to a second fitting associated with the other port of said first passge, the return line of the first rescue tool being connected to a third fitting associated with one port of a second passage, the supply line of a second rescue tool being connected to a fourth fitting associated with the other port of said second passage, means for connecting the return line of the second rescue tool to a fifth fitting associated with one port of a third passage, the power unit return line being connected to a sixth fitting associated with the other port of said third passage, whereby the fluid flows from said power unit serially through the supply and return lines of said first and second rescue tools and back to said power unit by way of said first, second and third passages in said block means, said first passage having a first passage portion connected to said one port thereof and a second passage portion connected to said other port thereof, said third passage having a first passage portion connected to said one port thereof and a second passage portion connected to said other port thereof, and valve means mounted on said block means for controlling flow between said passage portions of said first and third passages, said valve means being movable between a first flow control position in which flow communication is provided between the first passage portions of said first and third passages, and flow is interrupted between the first and second passage portions of said first passage and the first and second passage portions of said third passage whereby fluid flow is recirculated to the power unit, and a second flow control position in which flow communication is provided between said first and second passage portions of said first passage and between said first and second passage portions of said third passage, and flow is interrupted between the first passage portions of said first and third passages whereby fluid flows from the power unit serially through said rescue tools and back to said power unit.

9. A fluid supply according to claim 8 wherein said valve means includes a valve block containing a plurality of flow control passages constructed and arranged to communicate with said passage portions of said first and third flow passages.

10. In a pressurized fluid supply for a plurality of hydraulically powered rescue tools wherein a signle power unit, such as a pump, has a supply line for delivering the fluid under pressure and a return line through which the fluid is returned to the power unit, and wherein each of the rescue tools has a supply line for delivering pressurized fluid to an intake thereof and a return line for returning fluid from an exhaust thereof,
a series flow connector block means having a plurality if internal flow passages,
each of said internal flow passages providing flow communication between a pair of ports formed in an external surface of said block means,
a flow connector fitting associated with each of said ports and mounted on the external surfaces of said block means to extend from an associated port externally of said block means,
each of said fittings being constructed and arranged to deliver the fluid from its associated port and the flow passage communicating therewith to a flow line connected to the fitting to extend exernally from said block means,
said external flow lines including
a power unit supply line being connected to a first fitting associated with one port of a first passage,
a supply line of a first rescue tool being connected to a second fitting associated with the other port of said first passage,
a return line of the first rescue tool being connected to a third fitting associated with one port of a second passage,
a supply line of a second rescue tool being connected to a fourth fitting associated with the other port of said second passage,
a return line of a second rescue tool being connected to a fifth fitting associated with the one port of a third passage,
a supply line of a third tool being connected to a sixth fitting associated with the other port of said third passage,
a return line of the third rescue tool being connected to a seventh fitting associated with one port of a fourth passage, and
a power unit return line being connected to an eighth fitting associated with the other port of said fourth passage,
whereby the fluid flows from said power source serially through the supply and return lines of the first, second and third rescue toolsand back to said power source by way of said first, second, third and fourth passages in said block means.

11. A fluid supply according to claim 10 wherein each of said passages is formed by a pair of bores extending into said block from the surface thereof and interconnecting at inner ends of the pair of bores.

12. In a pressurized fluid supply for a plurality of hydraulically powered rescue tools wherein a single power unit, such as a pump, has a supply line for delivering the fluid under pressure and a return line through which the fluid is returned to the power unit, and wherein each of the rescue tools has a supply line for delivering pressurized fluid to an intake thereof and a return line for returning fluid from an exhaust thereof,
a series flow connector block means having a plurality of internal flow passages,
each of said internal flow passages providing flow communication between a pair of ports formed in a surface of said block means,
a flow conector fitting associated with each of said ports and mounted on said block means,
each of said fittings being constructed and arranged to deliver the fluid from its associated port and the flow passage communicating therewith to flow line connected to the fitting,
the power unit supply line being connected to a first fitting associated with one port of a first passage,
the supply line of a first rescue tool being connected to a second fitting associated with the other port of said first passsage,
the return line of the first rescue tool being connected to a third fitting associated with one port of a second passage,
the supply line of a second rescue tool being connected to a fourth fitting associated with the other port of said second passage,
the return line of the second rescue tool being connected to a fifth fitting associated with the one port of a third passage,
the supply line of a third tool being connected to a sixth fitting associated with the other port of said third passage,
the return line of the third rescue tool being connected to a seventh fitting associated with one port of fourth passage, and
the power unit return line being connected to an eighth fitting associated with the other port of said fourth passage,
whereby the fluid flows from said power source serially through the supply and return lines of first, second and third rescue tools and back to said power source by way of said first, second, third and fourth passages in said block means.
said block means having a plurality of side walls joined at corners, each of said passages extending from a port on one side wall around a corner to a port on an adjacent side wall.

13. A fluid supply according to claim 12 wherein each side wall has only two ports therein.

14. A fluid supply according to claim 12 wherein one fitting on one of the ports on a side wall is a male fitting and the other fitting on the other port on said side wall is a female fitting whereby a rescue tool can be connected with its supply and return lines connected to the male and female fittings on one side wall.

15. A fluid supply according to claim 14 wherein said block means has a bottom wall adapted to be supported in a horizontal orientation and a plurality of side walls having a flat surface facing upwardly at an angle to the vertical, the ports of each passage communicating with said upwardly facing flat surface of a side wall.

16. A fluid supply according to claim 1 wherein said external flow lines are connected to said fittings at quick release couplings wherein one half of the quick release coupling is formed on a flow connector fitting and the other half is connected on the associated external flow lines.

17. A fluid supply according to claim 1 wherein said external flow lines are flexible hydraulic hose lines capable of withstanding the high pressure of the fluid system.

18. A fluid system according to claim 17 wherein said external flow lines are provided with quick releasse couplings adapted to enagage and disengage with quick release couplings on the fittings associated therewith.

19. A fluid supply according to claim 1 wherein said flow connector fittings are threadedly engaged in said ports with which they are associated and are constructed and arranged to provide a quick release coupling with the external flow lines connected thereto.

20. A fluid supply according to claim 1 wherein one of the fittings associated with the supply and return lines of each of the rescue tools is a male fitting and the other fitting is a female fitting, said male and female fittings of each rescue tool being mounted on a common surface of said blocks means adjacent one another.

21. In a pressurized fluid supply for a plurality of hydraulically powered rescue tools wherein a single power unit, such as a pump, has a supply line for delivering the fluid under pressure and a return line through which the fluid is returned to the power unit, and wherein each of the rescue tools has a supply line for delivering pressurized fluid to an intake thereof and a return line for returning fluid from an exhaust thereof, a fluid flow control block means for controlling the supply of hydraulic fluid from from said single power unit to a rescue tool setup including a plurality of rescue tools, said block means having a plurality of internal flow passages communicating with ports formed in an external surface of said block means, a flow connector fitting associated with each of said ports and mounted on the external surface of said block means to extend from an associated port externally of said block means, each of said fittings being constructed and arranged to deliver the fluid from its associated port and the flow passage commuicating therewith to a flow line connected to the fitting to extend to a location remote from said block means, said power unit supply line being connected to a first fitting associated with a first port of said block means, a supply line of a first rescue tool being connected to a second fitting associated with a second port of said block means, a return line of the first rescue tool being connected to a third fitting associated with a third port of said block means, a supply line of a second rescue tool being connected to a fourth fitting associated with a fourth port of said block means, a return line of the second rescue tool being connected to a fifth fitting associated with a fifth port of said block means, said power unit return line being connected to a sixth fitting associated with a sixth port of said block means, said first and second rescue tools being connected to said block means from locations remote therefrom by said rescue tool supply and return lines, said block means having fluid flow control means including said internal flow passages constructed and arranged to direct hydraulic fluid delivered to said block means by way of said power unit supply line to the supply lines of each of said rescue tools and to direct hydraulic fluid returned to said block means by way of the return lines of said first and second rescue tools to said power unit return line.

22. A fluid supply according to claim 21 including valve measn mounted on said block means for controlling flow between said first and sixth ports connected, respectively, to said supply and return lines of said power unit, said valve means being movable between a first flow control position in which flow communication is provided between the internal passage communicating with said first port and the internal passages communicating with the supply lines for said rescue tools and direct flow communication between the first and sixth ports is interrupted whereby flow is deliverd to said rescue tools, and a second flow control position in which direct flow communication is provided between the first and sixth ports, and flow communication is interrupted between said first and sixth ports and the other ports of said block means whereby flow of pressurized fluid is recirculated to said power unit.

23. A fluid supply according to claim 21 wherein said block means has a bottom wall adapted to be supported in a horizontal orientation and a plurality of side walls having a flat surface facing upwardly at an angle to the vertical, the ports of each passage communicating with said upwardly facing flat surface of a side wall.

24. A fluid supply according to claim 21 wherein said external flow lines are connected to said fittings at quick release couplings wherein one half of the quick release coupling is formed on a flow connector fitting and the other half is connected to the associated external flow line.

* * * * *